United States Patent
Horbatiuk et al.

(10) Patent No.: US 12,541,601 B1
(45) Date of Patent: Feb. 3, 2026

(54) COMPLEMENTARY SCAN ENGINE SCHEME

(71) Applicant: Rapid7, Inc., Boston, MA (US)

(72) Inventors: Ian Horbatiuk, Toronto (CA); Paul Miseiko, Mississauga (CA)

(73) Assignee: Rapid7, Inc., Boston, MA (US)

( * ) Notice: Subject to any disclaimer, the term of this patent is extended or adjusted under 35 U.S.C. 154(b) by 156 days.

(21) Appl. No.: 17/706,828

(22) Filed: Mar. 29, 2022

(51) Int. Cl.
*G06F 21/57* (2013.01)

(52) U.S. Cl.
CPC ...... *G06F 21/577* (2013.01); *G06F 2221/033* (2013.01)

(58) Field of Classification Search
CPC .. G06F 21/577; G06F 2221/033; G06F 21/00; G06F 21/57; G06F 21/50; G06F 11/3688; G06F 11/3672; G06F 11/3676; G06F 21/562; G06F 21/563; G06F 21/564; G06F 21/565; G06F 21/56; G06F 21/55; G06F 21/554
See application file for complete search history.

(56) References Cited

U.S. PATENT DOCUMENTS

| | | | | |
|---|---|---|---|---|
| 10,084,825 B1 * | 9/2018 | Xu | ...... | H04L 63/0236 |
| 2007/0250935 A1 * | 10/2007 | Zobel | ...... | G06F 21/577 |
| | | | | 726/26 |
| 2008/0092237 A1 * | 4/2008 | Yoon | ...... | H04L 41/0894 |
| | | | | 726/25 |
| 2013/0167238 A1 * | 6/2013 | Russell | ...... | H04L 63/1433 |
| | | | | 726/25 |
| 2013/0268652 A1 * | 10/2013 | Hugard, IV | ...... | H04W 4/38 |
| | | | | 709/224 |
| 2013/0269028 A1 * | 10/2013 | Nakawatase | ...... | H04L 63/1433 |
| | | | | 726/22 |
| 2014/0082734 A1 * | 3/2014 | Guarnieri | ...... | G06F 21/577 |
| | | | | 726/25 |
| 2017/0142155 A1 * | 5/2017 | Tasiemski | ...... | H04L 63/1433 |
| 2018/0124095 A1 * | 5/2018 | Hamdi | ...... | G06F 7/24 |
| 2019/0114435 A1 * | 4/2019 | Bhalla | ...... | G06F 21/55 |
| 2019/0149572 A1 * | 5/2019 | Gorodissky | ...... | G06F 21/55 |
| | | | | 726/25 |

(Continued)

FOREIGN PATENT DOCUMENTS

WO  WO-2014130472 A1 *  8/2014  ............ G06F 21/51

*Primary Examiner* — Tae K Kim
(74) *Attorney, Agent, or Firm* — Ashwin Anand

(57) ABSTRACT

Various embodiments include systems and methods to implement a complementary scan engine scheme for avoiding redundant vulnerability check data collection when using a scan engine to scan a target asset. The implementation may include determining a set of potential vulnerability checks for scanning the target asset using the scan engine. Fingerprint data indicating which versions of software are installed on the target asset may be collected. Based at least in part on the fingerprint data, it may be determined that a particular version of a local scan agent is installed on the target asset. Responsive to a determination that the local scan agent is functioning, the scan engine may perform any vulnerability check, in the set of potential vulnerability checks, that is not covered by the local scan agent. Responsive to a determination that the local scan agent is not functioning, the scan engine may perform all vulnerability checks in the set of potential vulnerability checks.

20 Claims, 7 Drawing Sheets

(56) References Cited

U.S. PATENT DOCUMENTS

| | | | |
|---|---|---|---|
| 2021/0400074 A1* | 12/2021 | Smith | H04L 63/1408 |
| 2022/0100869 A1* | 3/2022 | Berger | G06F 21/566 |
| 2022/0286474 A1* | 9/2022 | Kuppa | G06F 21/552 |

* cited by examiner

COMPLEMENTARY SCAN ENGINE SCHEME

BACKGROUND

Many companies operate private computer networks that are connected to public networks such as the Internet. While such connections allow its users to easily access resources on the public networks, they also expose the company network to potential cyberattacks. For example, company users may unwittingly download malicious content (e.g., data, files, applications, programs, etc.) onto the company network from the Internet. As another example, interactions between company users and outsiders on the public network may result in leaks of proprietary information to allow malicious actors to gain unauthorized access to the company network. Different types of cyberattacks can be used to achieve a variety of different ends, for example, to obtain sensitive information, gain control of the company's computing systems, or damage the company's resources. As a result, enterprise security management systems have become increasingly important to protect private company networks against these types of vulnerabilities.

There are typically two approaches to asset vulnerability detection. A "local" scanning approach utilizes an application (e.g., an "agent") running on an asset (e.g., a computer, an Internet of Things (IoT) device, or network device, etc.) when performing a vulnerability scan. By contrast, an "external" scanning approach may perform a vulnerability scan of the asset via remote network connections. These two approaches may not produce the same set of results, and each approach has its own advantages and disadvantages.

SUMMARY OF EMBODIMENTS

The systems and methods described herein may be employed in various combinations and in embodiments to implement a complementary scan engine scheme for avoiding redundant vulnerability check data collection when using a scan engine to scan a target asset. Responsive to a determination that a local scan agent is functioning, the scan engine may be utilized to perform any vulnerability check, in a set of potential vulnerability checks, that is not covered by the local scan agent. Responsive to a determination that the local scan agent is not functioning, the scan engine may be utilized to perform all vulnerability checks in the set of potential vulnerability checks.

Figure 1:
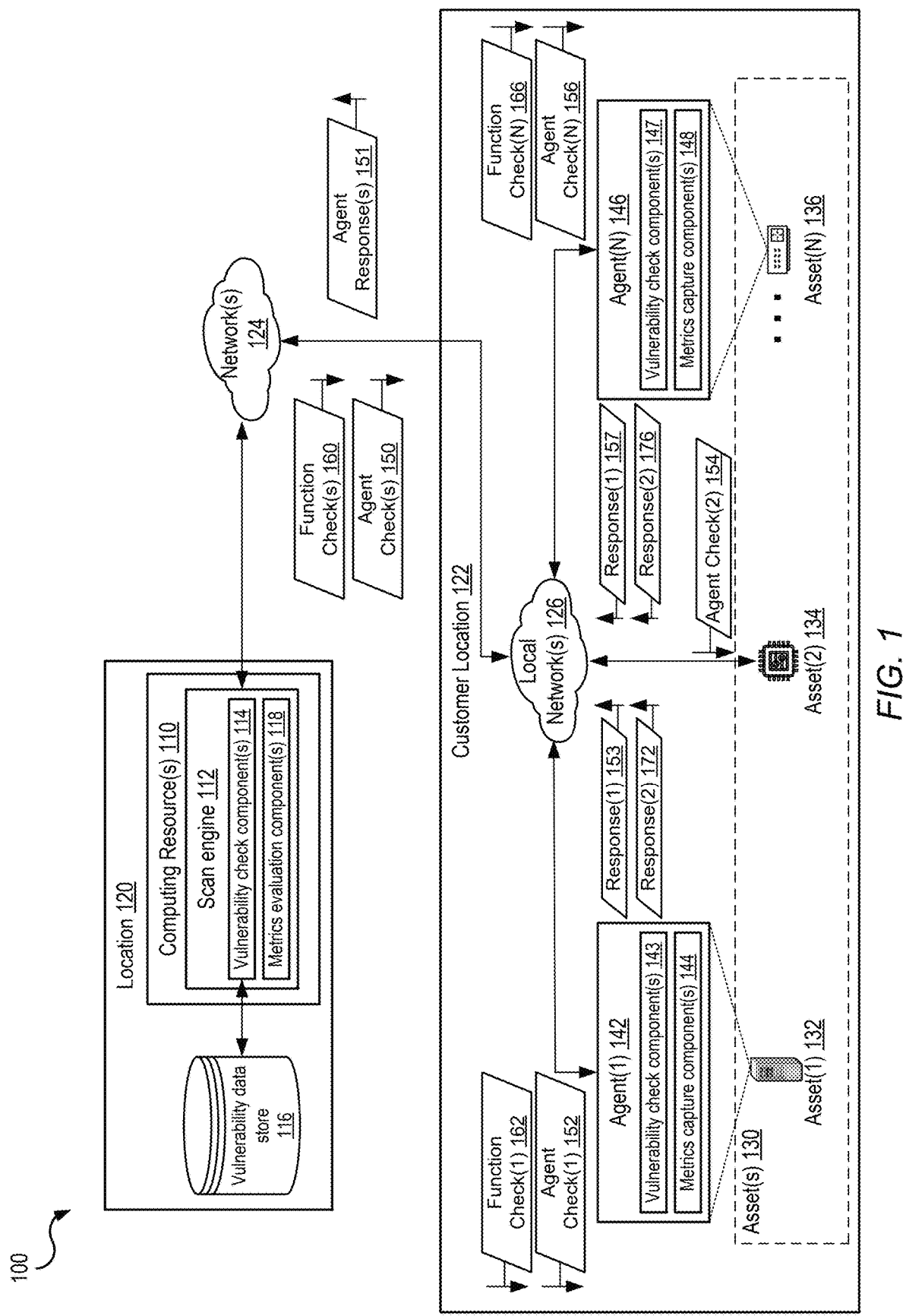
FIG. 1 is a block diagram illustrating an example system that implements a complementary scan engine scheme for avoiding redundant vulnerability check data collection when using a scan engine to scan a target asset, in accordance with some embodiments.

While embodiments are described herein by way of example for several embodiments and illustrative drawings, those skilled in the art will recognize that embodiments are not limited to the embodiments or drawings described. It should be understood that the drawings and detailed description thereto are not intended to limit embodiments to the particular form disclosed, but on the contrary, the intention is to cover all modifications, equivalents and alternatives falling within the spirit and scope as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

The present disclosure describes systems and methods of implementing a complementary scan engine scheme for avoiding redundant vulnerability check data collection when using a scan engine to scan a target asset.

One step of a scan is to run a series of "checks" (also referred to herein as "vulnerability checks") that perform and collect data related to a particular asset. Local and external approaches to scanning are not mutually exclusive and can be used in conjunction, in some cases. An advantage of a local scan is that it is generally considered relatively "lightweight" in that it is less disruptive than an external scan to both the asset and the network environment. Further, a local scanning approach may provide the ability to monitor the asset more effectively and may not perform vulnerability check data collection when already under a relatively heavy load. With respect to an external scan, it can be run and configured for a single location and may be relatively easy for users to administer. Further, an external scanning approach may be advantageous in that it may provide the ability to collect detailed network information that may otherwise not be collected when using a local scanning approach. This is due to the fact that there are many types of devices that cannot, as a practical matter, run a local agent.

From a customer's perspective, the "weight" discrepancy in terms of scan impact and resource requirements may be significant. In cases where a local agent is deployed and an external scan is being used, there may be an additional issue in that there may be an "overlapping set" of data that is collected, thereby reducing the overall efficiency of the scan. The present disclosure may mitigate this efficiency issue by interrogating the local agent to determine whether a particular scan involves collection of data from the "overlapping set" of data. If the particular scan does not involve the collection of such data, the systems and methods of the present disclosure may advantageously provide improved efficiency by skipping that stage of data collection (on supported assets).

The systems and methods of the present disclosure provide the ability for an external scanning system (e.g., a scan engine external to the asset) to coordinate its scan of an asset with a local agent that is running on the asset, thereby allowing for a more efficient scan. As described herein, the present disclosure may provide the ability for a scan engine to interrogate a local agent on an asset regarding its scan performance and history. Based on this information from the local agent, the scan engine may perform a set of external scanning operations on the asset or may refrain from performing at least a subset of the external scanning operations.

Vulnerability check content may be stored in content files (also referred to herein as "vulnerability check" or "vck" files) which may be loaded by a scan engine separately from a code base that defines a vulnerability and that identifies particular items to be verified to determine whether a particular vulnerability is associated with a given target asset. Such vulnerability check files may be processed into a series of rules for a rules engine in order to process data collected from the given target asset in an efficient manner. In some cases, an action may be triggered responsive to particular conditions for a given rule being satisfied. According to some embodiments, the rules for the rules engine may be modified in memory by the engine in cases where: (i) an agent/scan engine complementary scan scheme option is enabled; and (ii) the particular vulnerability check is applicable to the local agent as well. In cases where the local agent has already collected data for performing the particular vulnerability check, the scan engine may refrain from performing the particular vulnerability check.

As described herein, scanning a system may involve the collection of "fingerprints" (also referred to herein as versions) of particular software installed on a given target asset. When the target asset being scanned contains a particular fingerprint (e.g., an agent fingerprint from Rapid7, Inc.) and the agent/scan engine complementary scan scheme option is enabled, collection of data related to the status or "health" of the agent process on the system may be enabled. In such cases, when the local agent is considered "healthy"/"functioning" (e.g., running, collecting, and uploading data as per a defined agent schedule), the scan engine may provide an indication to the rules engine that the agent is "healthy"/"functioning" and that a set of rules that are covered by data collected from the agent can be skipped.

Among various advantages of the approaches described herein, the systems and methods of the present disclosure may improve the efficiency of scans by reducing the central processing unit (CPU), memory, network throughput and/or data storage utilization relative to a conventional external scan. Additionally, the systems and methods of the present disclosure may improve the efficiency of scans by reducing the amount of time to perform a scan of an asset. To illustrate, external scanning of network assets utilizes CPU cycles on both the scanning and scanned system. Accordingly, usage of any cycles on any intermediate network routing equipment may be eliminated for each vulnerability check that is removed from a typical set of external scanning operations and that is no longer performed.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, and components have not been described in detail so as not to unnecessarily obscure aspects of the embodiments.

Referring to FIG. 1, a block diagram illustrates various components of an example system 100 that implements a complementary scan engine scheme for avoiding redundant vulnerability check data collection when using a scan engine to scan a target asset, in accordance with some embodiments.

Figure 5:
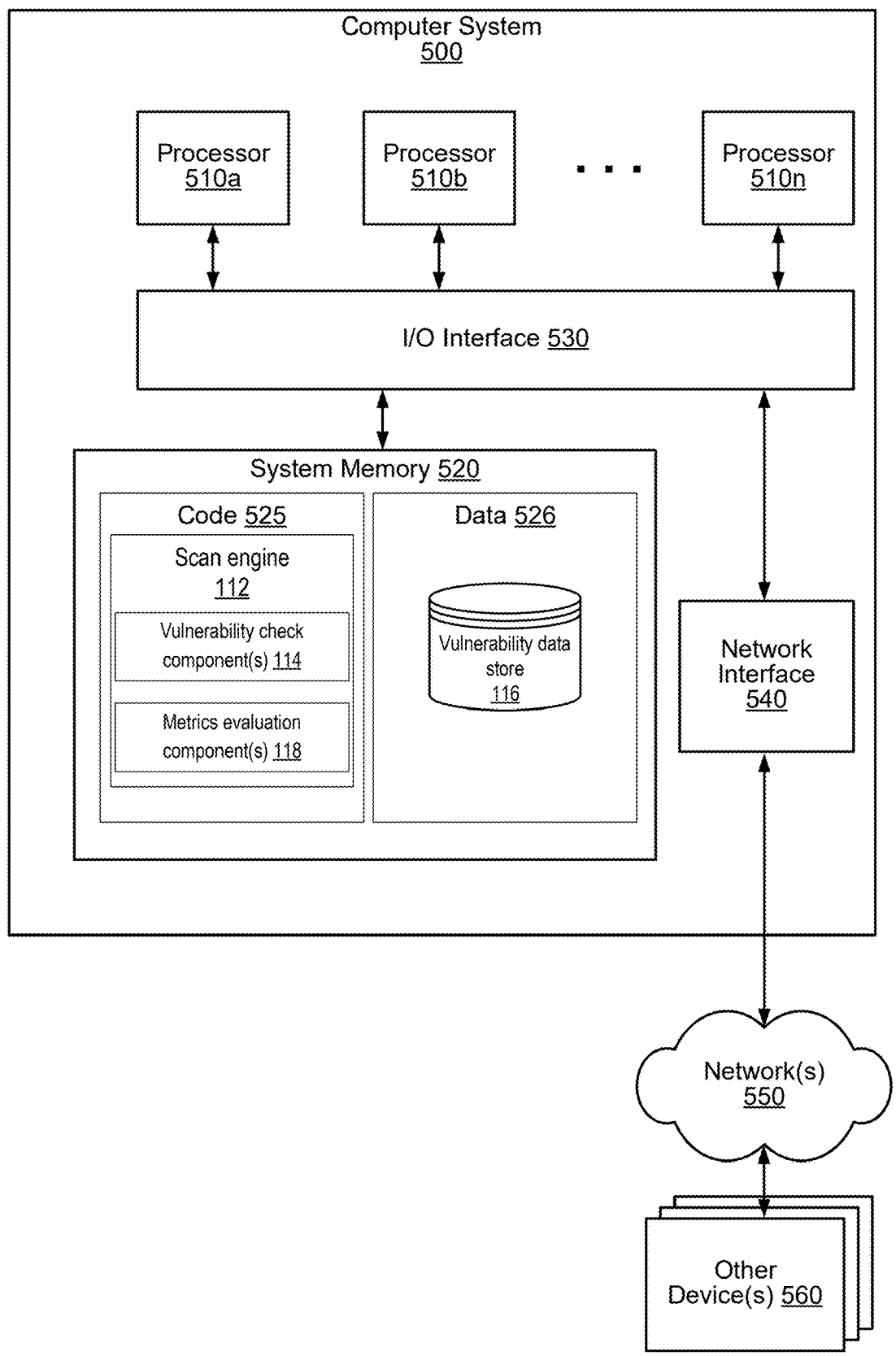
FIG. 5 is a block diagram illustrating an example computer system that may be used to implement one or more portions of a system that implements a complementary scan engine scheme for avoiding redundant vulnerability check data collection when using a scan engine to scan a target asset, according to some embodiments.

FIG. 1 depicts one or more computing resources 110, which may include one or more hardware processors with associated memory (not shown, see e.g., FIG. 5). The computing resource(s) 110 may be configured to implement a process of implementing a complementary scan engine scheme for avoiding redundant vulnerability check data collection when using a scan engine to scan a target asset. FIG. 1 illustrates that the computing resource(s) 110 may include: a scan engine 112; one or more vulnerability check components 114; a vulnerability data store 116; and one or more metrics evaluation components 118.

According to various embodiments, FIG. 1 illustrates that the scan engine 112 may be configured to determine a set of potential vulnerability checks for scanning a target asset using the scan engine 112. In FIG. 1, the scan engine 112 is located at a location 120, which may be a customer location 122 or a different location (e.g., a remote location with respect to the customer location 122). The scan engine 112 may communicate information to assets in the customer location 122 via a combination one or more networks 124 external to the customer location 122 and/or one or more local networks 126 at the customer location 126 (e.g., one or more local area networks). In the particular embodiment depicted in FIG. 1, one or more assets 130 (accessible via the one or more local networks 126) are depicted at the customer location 112, including: a first asset 132, a second asset 134, up to an Nth asset 136.

According to some embodiments, FIG. 1 illustrates that: a first local scan agent 142 may be associated with the first asset 132; the second asset 134 may not contain a local scan agent; and an Nth local scan agent 146 may be associated with the Nth asset 136. According to some embodiments, FIG. 1 illustrates that the first local agent 142 associated with the first asset 132 at the customer location 122 may contain various components, including at least: one or more vulnerability check components 143 and one or more metrics capture components 144. According to some embodiments, FIG. 1 illustrates that the Nth local scan agent 146 associated with the Nth asset 136 at the customer location 122 may also contain various components, including at least: one or more vulnerability check components 147 and one or more metrics capture components 148.

According to some embodiments, FIG. 1 illustrates that the scan engine 112 may be configured to interrogate individual assets by communicating one or more agent checks 150 to the individual assets. For example, according to some embodiments, the scan engine 112 may be configured to communicate a first agent check 152 to the first asset 132. As another example, according to some embodiments, the scan engine 112 may be configured to communicate a second agent check to the second asset 134. As yet another example, according to some embodiments, the scan engine 112 may be configured to communicate an Nth agent check 156 to the Nth asset 146.

FIG. 1 illustrates that the various local scan agents and/or the assets at the customer location 122 (e.g., the first local scan agent 142 and the Nth local scan agent 146) may be configured to communicate one or more agent responses 151 to the scan engine 112. For example, FIG. 1 illustrates that, responsive to the first agent check 152, the first local scan agent 142 and/or the first asset 132 may be configured to communicate a first response 153 to the scan engine 112. To illustrate, the first response 153 from the first local scan agent 142 (and/or from the first asset 132) may include at least information indicating to the scan engine 112 that the first local scan agent 142 is present and active at the first asset 132. As another example, FIG. 1 illustrates that, responsive to the Nth agent check 156, the Nth local scan agent 146 (and/or the Nth asset 136) may be configured to communicate a first response 157 to the scan engine 112. To illustrate, the first response 157 from the Nth local scan agent 156 (and/or from the Nth asset 136) may include at least information indicating to the scan engine 112 that the Nth local scan agent 146 is present and active at the Nth asset 136.

According to some embodiments, FIG. 1 illustrates that, in cases where a local scan agent is deployed and an external scan is being used, there may be an additional issue in that there may be an "overlapping set" of data that is collected, thereby reducing the overall efficiency of the scan. The system 100 of FIG. 1 may mitigate this efficiency issue by interrogating the local scan agent to determine whether a particular scan involves collection of data from the "overlapping set" of data. If the particular scan does involve the collection of such data, the system 100 of FIG. 1 may advantageously provide improved efficiency by skipping that stage of data collection (on supported assets).

According to some embodiments, the system 100 of FIG. 1 may provide the ability for the scan engine 112 to coordinate its scan of a particular asset with a local scan agent that is running on the particular asset, thereby allowing for a more efficient scan. To illustrate, the system 100 of FIG. 1 may provide the ability for the scan engine 112 to interrogate a local scan agent associated with a particular asset regarding its scan performance and history. Based at least in part on this information from the local scan agent, the scan engine 112 may perform a set of external scanning operations on the asset or may refrain from performing at least a subset of the external scanning operations.

According to some embodiments, FIG. 1 illustrates that scanning a system may involve the collection of "fingerprints" (also referred to herein as versions) of particular software installed on a given target asset. When the target asset being scanned contains a particular fingerprint (e.g., an agent fingerprint from Rapid7, Inc.) and the agent/scan engine complementary scan scheme option is enabled, collection of data related to the status or "health" of the agent process on the system may be enabled. In such cases, when the local scan agent is considered "healthy"/"functioning" (e.g., running, collecting, and uploading data as per a defined agent schedule), the scan engine 112 may provide an indication to the rules engine that the agent is "healthy"/"functioning" and that a set of rules that are covered by data collected from the local scan agent can be skipped by the scan engine 112. FIG. 1 illustrates that the scan engine 112 may be configured to interrogate individual local scan agents (and/or individual assets) by communicating one or more function checks 160 to the individual local scan agents (and/or to individual assets).

Figure 2A:
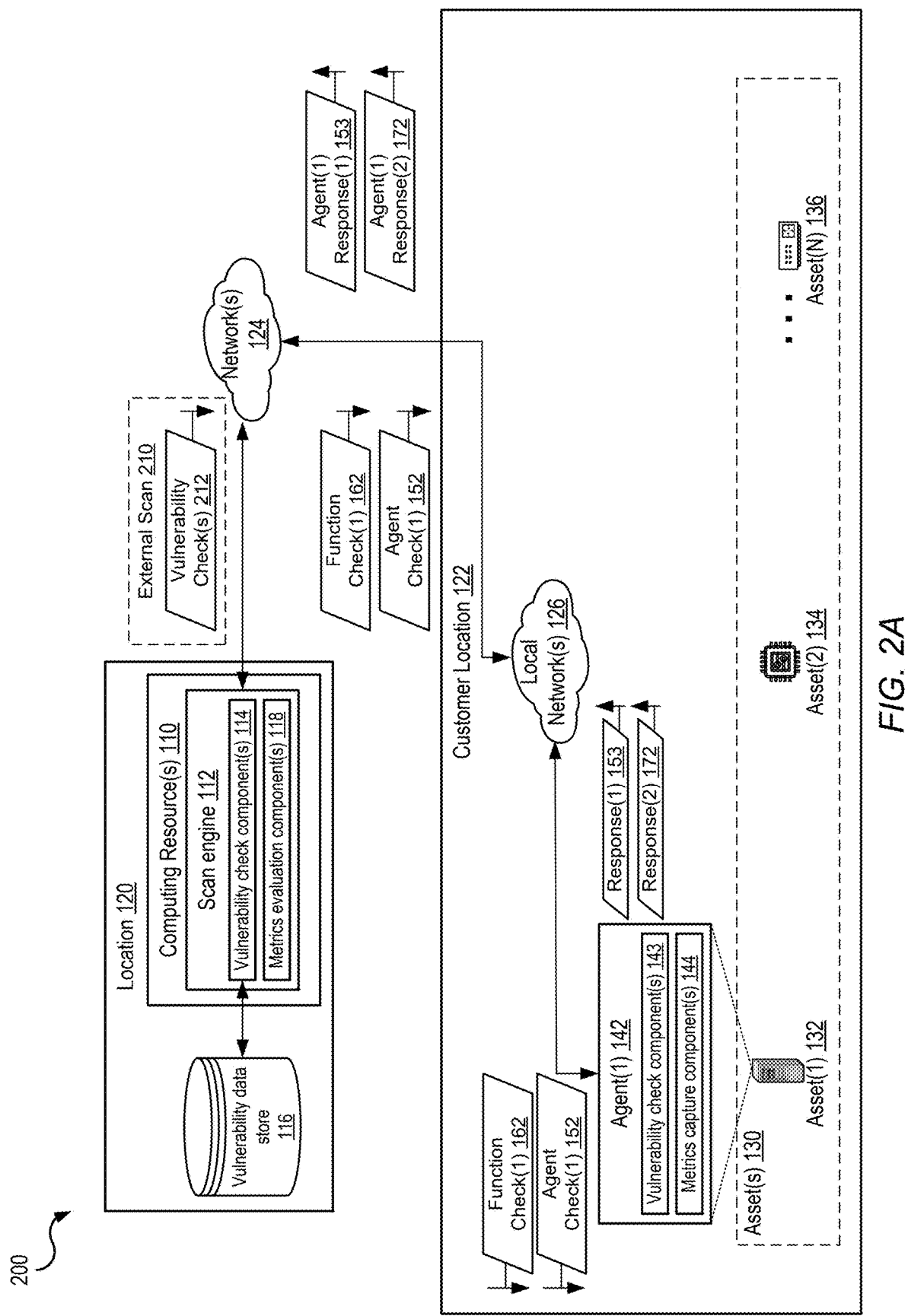
FIG. 2A is a block diagram illustrating an example system that implements a complementary scan engine scheme for avoiding redundant vulnerability check data collection when using a scan engine to scan a target asset, in accordance with some embodiments. In this example, the system may perform an evaluation of a local scan agent (e.g., installed on the target asset) that results in an external scan being performed by the scan engine for the target asset, in accordance with some embodiments.

For example, FIG. 1 illustrates that the scan engine 112 may be configured to interrogate the first local agent 142 associated with the first asset 132 by communicating one or more function checks 160 to the first local scan agent 142. For example, the function check(s) 160 may be used to check on the health status of the first local scan agent 142. The metrics capture component(s) 144 of the first local scan agent 142 may be configured to capture information regarding its scan performance and history, which may be communicated to the scan engine 112 as a second response 172. The information included in the second response 172 from the first local scan agent 142 may be evaluated by the metrics evaluation component(s) 118 of the scan engine 112, e.g., to determine whether the first local scan agent 142 is "healthy"/"functioning". Based on this evaluation, the scan engine 112 may be configured to determine whether to perform a set of external scanning operations on the first asset 132 or to refrain from performing at least a subset of the external scanning operations. As described herein, FIG. 2A depicts an example of a particular embodiment in which the evaluation results in an external scan 210 being performed by the scan engine 112 for the first asset 132. In alternative embodiments, such as the example depicted in FIG. 2C for the Nth asset 136, the evaluation results may result in a hybrid external/local scan being performed for the Nth asset 136.

Figure 2B:
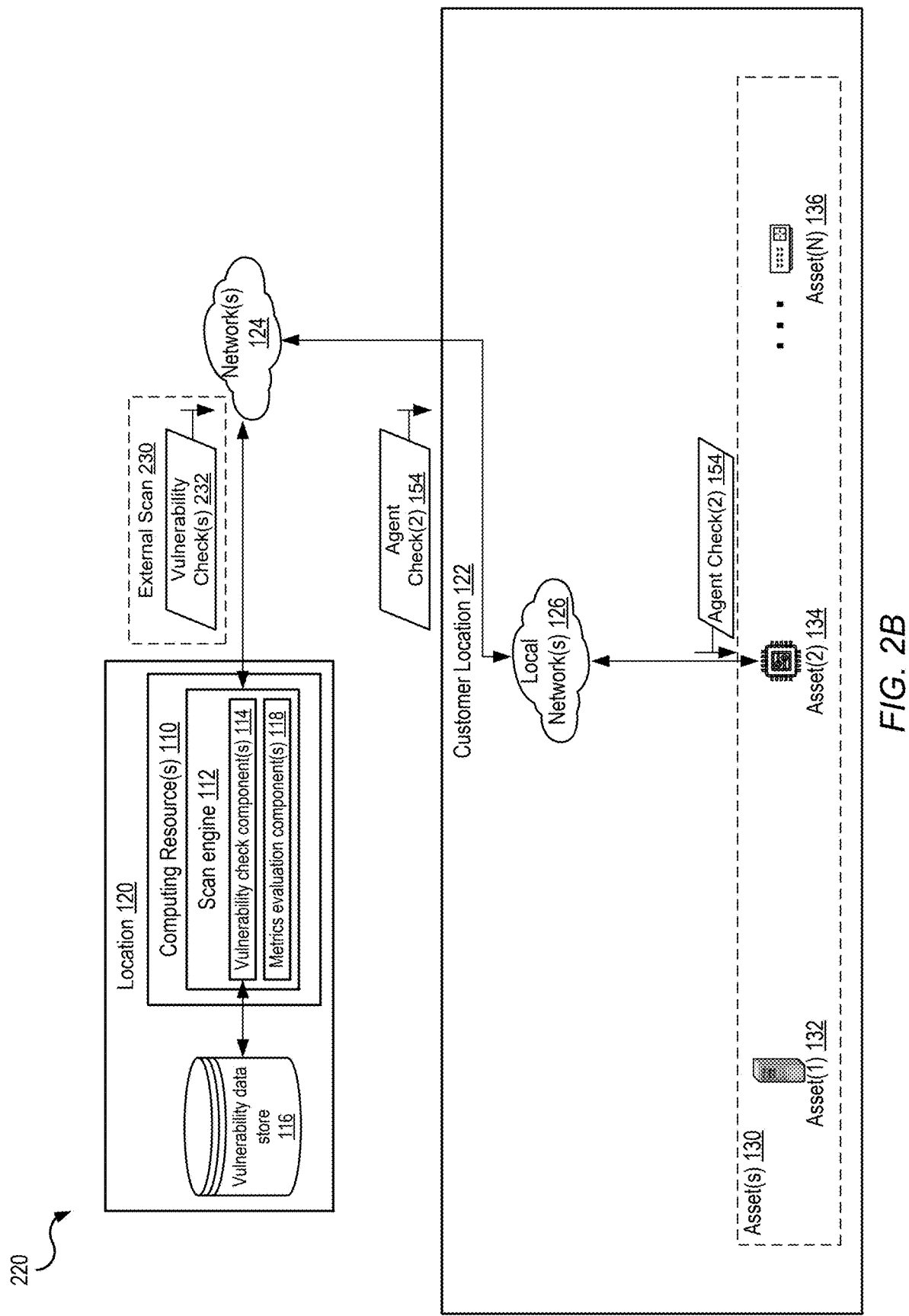
FIG. 2B is a block diagram illustrating an example system that implements a complementary scan engine scheme for avoiding redundant vulnerability check data collection when using a scan engine to scan a target asset, in accordance with some embodiments. In this example, the system may determine that there is no local scan agent present at the target asset, and thus an external scan may be performed by the scan engine for the target asset, in accordance with some embodiments.

As another example, FIG. 1 illustrates that the scan engine 112 may not communicate such function checks to the second asset 134 as the second agent check 154 was indicative of no local agent being present and active at the second asset 134. As described herein, FIG. 2B depicts an example of a particular embodiment of an external scan 230 being performed by the scan engine 112 for the second asset 134.

Figure 2C:
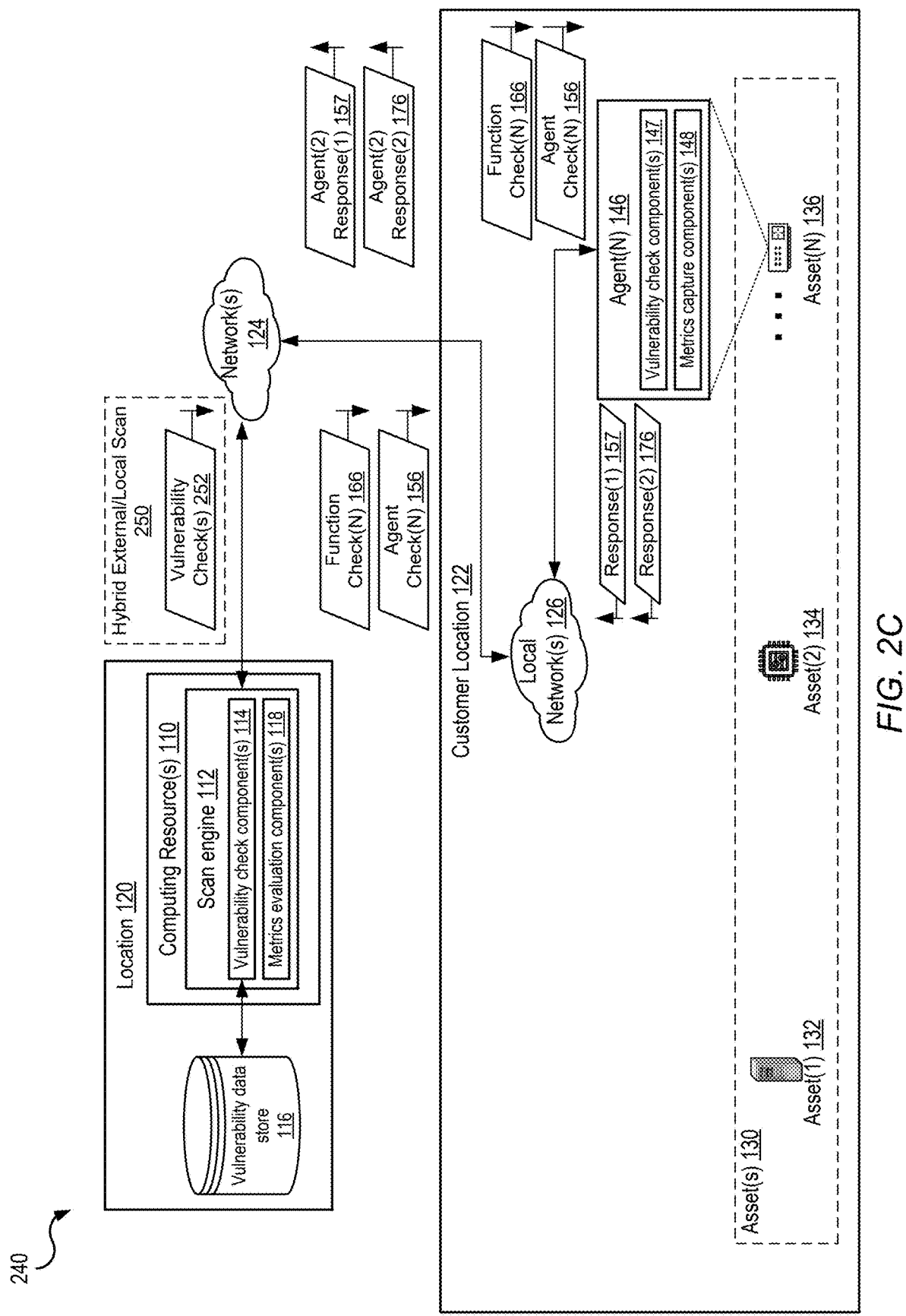
FIG. 2C is a block diagram illustrating an example system that implements a complementary scan engine scheme for avoiding redundant vulnerability check data collection when using a scan engine to scan a target asset, in accordance with some embodiments. In this example, the system may perform an evaluation of a local scan agent (e.g., installed on the target asset) that results in a hybrid external/local scan being performed for the target asset, in accordance with some embodiments.

As yet another example, FIG. 1 illustrates that the scan engine 112 may be configured to interrogate the Nth local scan agent 146 associated with the Nth asset 136 by communicating one or more function checks 166 to the Nth local scan agent 146. The metrics capture component(s) 148 of the Nth local scan agent 146 may be configured to capture information regarding its scan performance and history, which may be communicated to the scan engine 112 as a second response 176. The information included in the second response 176 from the Nth local scan agent 146 may be evaluated by the metrics evaluation component(s) 118 of the scan engine 112, e.g., to determine whether the Nth local scan agent 146 is "healthy"/"functioning". Based on this evaluation, the scan engine 112 may be configured to determine whether to perform a set of external scanning operations on the Nth asset 136 or to refrain from performing at least a subset of the external scanning operations. As described herein, FIG. 2C depicts an example of a particular embodiment in which the evaluation results in a hybrid external/local scan 250 being performed by the scan engine 112 for the Nth asset 136. In alternative embodiments, such as the example depicted in FIG. 2A for the first asset 132, the evaluation results may result in a fully external scan being performed for the Nth asset 136.

According to some embodiments, FIG. 1 illustrates that vulnerability check content may be stored in content files (also referred to herein as "vulnerability check" or "vck" files) in the vulnerability data store 116. The vulnerability check component(s) 114 of the scan engine 112 may load the vulnerability check files separately from a code base that defines a vulnerability and that identifies particular items to be verified to determine whether a particular vulnerability is associated with a given target asset. Such vulnerability check files may be processed into a series of rules for a rules engine in order to process data collected from the given target asset in an efficient manner. In some cases, an action may be triggered responsive to particular conditions for a given rule being satisfied. According to some embodiments, the rules for the rules engine may be modified in memory by the scan engine 112 in cases where: (i) an agent/scan engine complementary scan scheme option is enabled; and (ii) the particular vulnerability check is applicable to the local scan agent as well. In cases where the local scan agent has already collected data for performing the particular vulnerability check, the scan engine 112 may refrain from performing the particular vulnerability check.

Among various advantages, the system 100 of FIG. 1 may improve the efficiency of scans by reducing the CPU, memory, network throughput and/or data storage utilization relative to a conventional external scan. Additionally, the system 100 of FIG. 1 may improve the efficiency of scans by reducing the amount of time to perform a scan of an asset. To illustrate, external scanning of network assets utilizes CPU cycles on both the scanning and scanned system. Accordingly, usage of any cycles on any intermediate network routing equipment may be eliminated for each vulnerability check that is removed from a typical set of external scanning operations and that is no longer performed.

Thus, the system 100 depicted in FIG. 1 represents an example of a system that implements a complementary scan engine scheme for avoiding redundant vulnerability check data collection when using a scan engine to scan a target asset.

FIG. 2A is a block diagram 200 that illustrates an example process of implementing a complementary scan engine scheme for avoiding redundant vulnerability check data collection when using a scan engine to scan a target asset, in accordance with some embodiments.

According to various embodiments, FIG. 2A illustrates that the scan engine 112 may be configured to determine a set of potential vulnerability checks for scanning the first target asset 132 using the scan engine 112. According to some embodiments, FIG. 2A illustrates that the scan engine 112 may be configured to interrogate the first local scan agent 142 and/or the first asset 132 at the customer location 122 by communicating the first agent check 152 to the first asset 132. FIG. 2A illustrates that, responsive to the first agent check 152, the first local scan agent 142 and/or the first asset 132 may be configured to communicate the first response 153 to the scan engine 112. To illustrate, the first response 153 from the first local scan agent 142 (and/or from the first asset 132) may include at least information indicating to the scan engine 112 that the first local scan agent 142 is present and/or active at the first asset 132.

FIG. 2A illustrates that the scan engine 112 may interrogate the first local scan agent 142 associated with the first asset 132 by communicating the first function check 162 to the first local scan agent 142. The metrics capture component(s) 144 of the first local scan agent 142 may capture information regarding its scan performance and history, which may be communicated to the scan engine 112 as the second response 172. The information included in the second response 172 from the first local scan agent 142 may be evaluated by the metrics evaluation component(s) 118 of the scan engine 112. Based on this evaluation, the scan engine 112 may determine whether to perform a set of external scanning operations on the first asset 132 or to refrain from performing at least a subset of the external scanning operations. FIG. 2A depicts an example of a particular embodiment in which the evaluation results in a fully external scan 210 being performed by the scan engine 112 for the first asset 132. For example, the external scan 210 may be performed responsive to a determination that the first local scan agent 142 is not functioning, and the scan engine 112 may be utilized to perform all vulnerability checks 212 in the set of potential vulnerability checks.

Thus, FIG. 2A illustrates an example process of implementing a complementary scan engine scheme for avoiding redundant vulnerability check data collection when using a scan engine to scan a target asset. In FIG. 2A, an evaluation by the scan engine 112 results in the external scan 210 being performed for the first asset 132 at the customer location 122.

FIG. 2B is a block diagram 220 that illustrates an example process of implementing a complementary scan engine scheme for avoiding redundant vulnerability check data collection when using a scan engine to scan a target asset, in accordance with some embodiments.

According to various embodiments, FIG. 2B illustrates that the scan engine 112 may be configured to determine a set of potential vulnerability checks for scanning the second target asset 134 using the scan engine 112. According to some embodiments, FIG. 2B illustrates that the scan engine 112 may communicate the second agent check 154 to the second asset 134. FIG. 2B illustrates that, as there is no local agent present on the second asset 134, there is no response communicated to the scan engine 112. Accordingly, FIG. 2B depicts an example of a particular embodiment in which a fully external scan 230 is performed by the scan engine 112 for the second asset 134. That is, the scan engine 112 may perform all vulnerability checks 232 in the set of potential vulnerability checks.

FIG. 2C is a block diagram 240 that illustrates an example process of implementing a complementary scan engine scheme for avoiding redundant vulnerability check data collection when using a scan engine to scan a target asset, in accordance with some embodiments.

According to various embodiments, FIG. 2C illustrates that the scan engine 112 may be configured to determine a set of potential vulnerability checks for scanning the Nth target asset 136 using the scan engine 112. According to some embodiments, FIG. 2C illustrates that the scan engine 112 may be configured to interrogate the Nth local scan agent 146 and/or the Nth asset 136 at the customer location 122 by communicating the Nth agent check 156 to the Nth asset 136. FIG. 2C illustrates that, responsive to the Nth agent check 156, the Nth agent 146 may be configured to communicate the first response 157 to the scan engine 112. To illustrate, the first response 157 from the Nth local scan agent 146 (and/or from the Nth asset 136) may include at least information indicating to the scan engine 112 that the Nth agent 146 is present and/or active at the Nth asset 136.

FIG. 2C illustrates that the scan engine 112 may interrogate the Nth local scan agent 146 associated with the Nth asset 136 by communicating the Nth function check 166 to the Nth local scan agent 146. The metrics capture component(s) 148 of the Nth local scan agent 146 may capture information regarding its scan performance and history, which may be communicated to the scan engine 112 as the second response 176. The information included in the second response 176 from the Nth local scan agent 146 may be evaluated by the metrics evaluation component(s) 118 of the scan engine 112. Based on this evaluation, the scan engine 112 may determine whether to perform a set of external scanning operations on the Nth asset 136 or to refrain from performing at least a subset of the external scanning operations. FIG. 2C depicts an example of a particular embodiment in which the evaluation results in a hybrid external/local scan 250 being performed for the Nth asset 136.

Thus, FIG. 2C illustrates an example process of implementing a complementary scan engine scheme for avoiding redundant vulnerability check data collection when using a scan engine to scan a target asset. In FIG. 2C, an evaluation by the scan engine 112 results in the hybrid external/local scan 250 being performed for the Nth asset 136 at the customer location 122. For example, the scan engine 112 may perform a subset of vulnerability checks 252 in the set of potential vulnerability checks.

Figure 3:
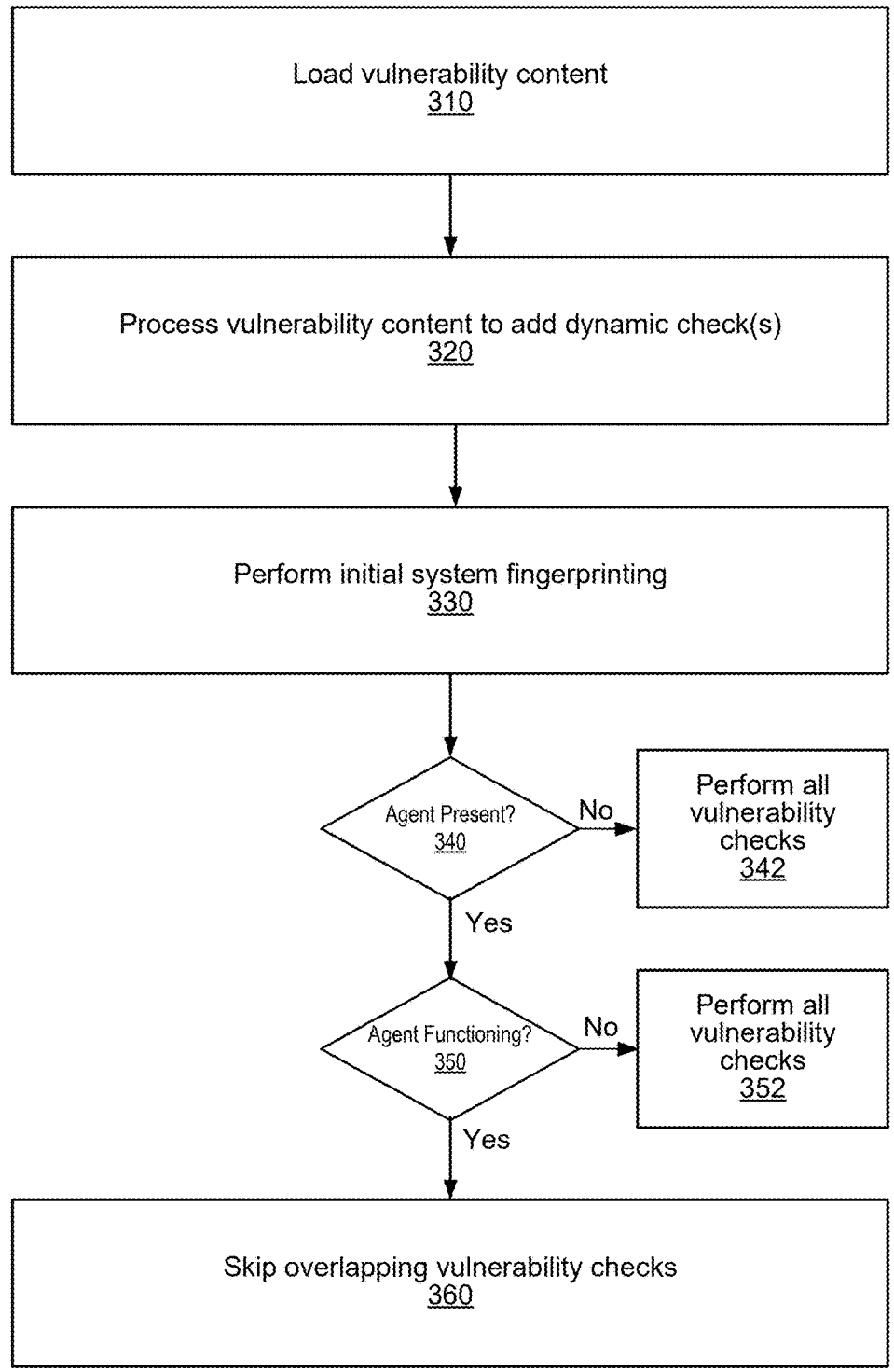
FIG. 3 is a flowchart that illustrates an example process of implementing a complementary scan engine scheme for avoiding redundant vulnerability check data collection when using a scan engine to scan a target asset, according to some embodiments.

FIG. 3 is a flowchart 300 that illustrates an example of a process of implementing a complementary scan engine scheme for avoiding redundant vulnerability check data collection when using a scan engine to scan a target asset, according to some embodiments. In FIG. 3, one or more hardware processors may be utilized to implement the complementary scan engine scheme.

At operation 310, the process includes loading vulnerability content. For example, referring to FIG. 1, the vulnerability check component(s) 114 of the scan engine 112 may load vulnerability content from the vulnerability data store 116.

At operation 320, the process includes processing vulnerability content to add one or more dynamic checks. For example, referring to FIG. 1, the vulnerability check component(s) 114 of the scan engine 112 may process the vulnerability content from the vulnerability content store 116 to add one or more dynamic checks.

At operation 330, the process includes performing initial system fingerprinting. For example, referring to FIG. 1, the scan engine 112 may perform initial system fingerprinting of each of the local assets 132, 134, and 136 at the customer location 122.

At operation 340, the process includes determining whether a local scan agent is present at a target asset. FIG. 3 illustrates that, responsive to determining that no agent is present at operation 340, the process may proceed to operation 342 to perform all vulnerability checks. For example, referring to FIG. 1, responsive to determining that no local scan agent is present at the second asset 134, the process may proceed to operation 342 to perform, using the scan engine 112, all vulnerability checks (depicted as the external scan 230 in FIG. 2B).

FIG. 3 further illustrates that, responsive to determining that a local scan agent is present at operation 340, the process may proceed to operation 350. For example, referring to FIG. 1, the scan engine 112 may determine that the first local scan agent 142 is present at the first asset 132 based on the first response 153 from the first local scan agent 142 that is received responsive to the first agent check 152. As another example, referring to FIG. 1, the scan engine 112 may determine that the Nth local scan agent 146 is present at the Nth asset 136 based on the first response 157 from the Nth local scan agent 146 that is received responsive to the Nth agent check 156.

At operation 350, the process may include determining whether the local scan agent is functioning. FIG. 3 illustrates that, responsive to determining that the agent is not functioning, the process may proceed to operation 352 to perform, using the scan engine 112, all vulnerability checks. For example, referring to FIG. 2A, the scan engine 112 may determine that the first local scan agent 142 associated with the first asset 132 is not functioning. Accordingly, as depicted in FIG. 2A, this determination may result in the fully external scan 210 being performed by the scan engine 112 for the first asset 132.

FIG. 3 further illustrates that, responsive to determining that the local scan agent is functioning at operation 350, the process may proceed to operation 360. For example, referring to FIG. 2C, the scan engine 112 may determine that the Nth local scan agent 146 associated with the Nth asset 136 is functioning properly. Accordingly, as depicted in FIG. 2C, this determination may result in the hybrid external/local scan 250 being performed for the Nth asset 136.

At operation 360, the process may include skipping overlapping vulnerability checks. For example, referring to FIG. 2C, the hybrid external/local scan 250 may include the scan engine 112 skipping one or more of the set of potential vulnerability check(s) for the Nth asset 136 and performing a subset of the potential vulnerability checks that are not covered by vulnerability check data collection attributable to the Nth local scan agent 146.

Thus, FIG. 3 illustrates an example of a process of implementing a complementary scan engine scheme for avoiding redundant vulnerability check data collection when using a scan engine to scan a target asset.

Figure 4:
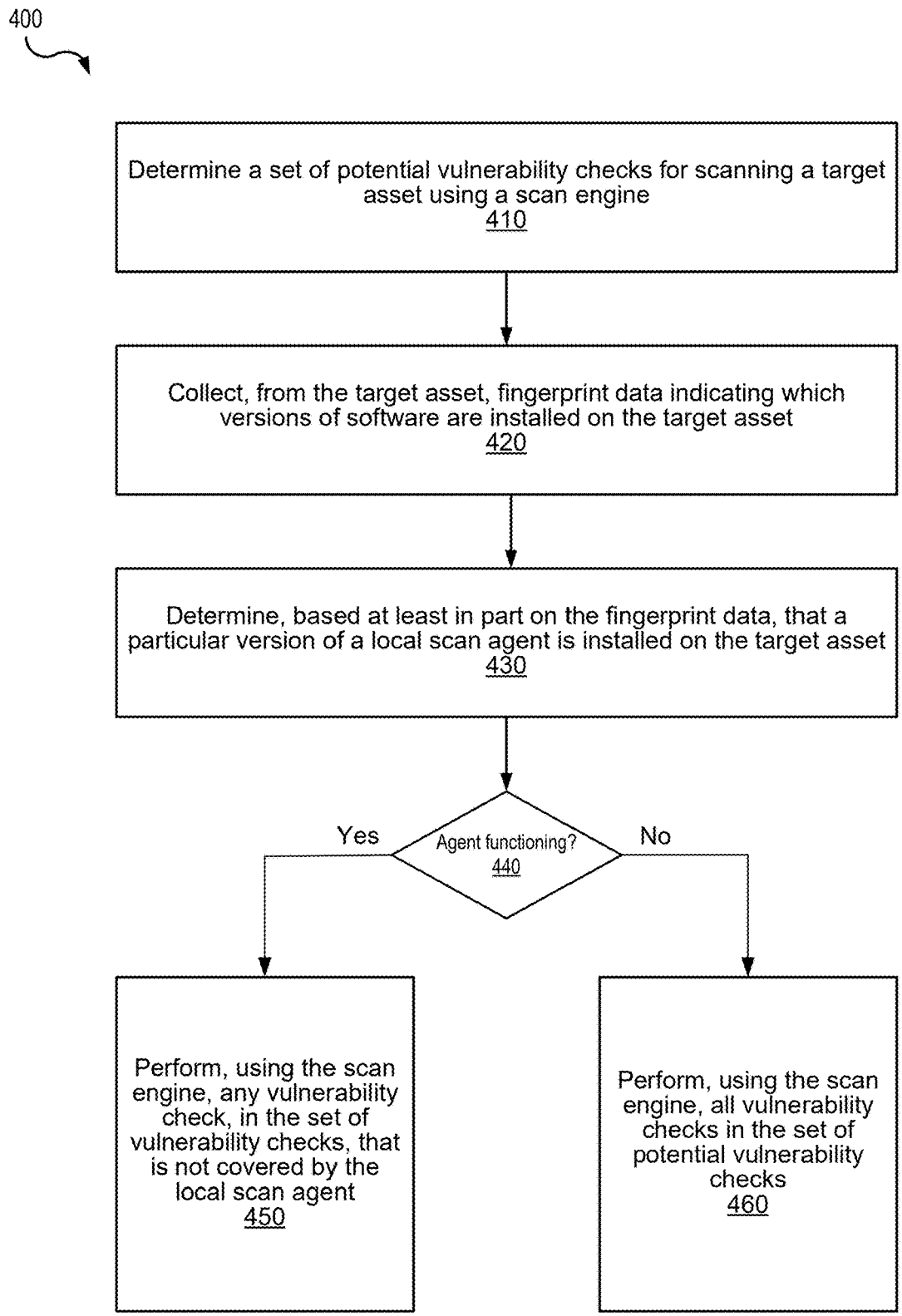
FIG. 4 is a flowchart that illustrates an example process of implementing a complementary scan engine scheme for avoiding redundant vulnerability check data collection when using a scan engine to scan a target asset, according to some embodiments.

FIG. 4 is a flowchart 400 that illustrates an example of a process of implementing a complementary scan engine scheme for avoiding redundant vulnerability check data collection when using a scan engine to scan a target asset, according to some embodiments. In FIG. 4, one or more hardware processors may be utilized to implement the complementary scan engine scheme.

At operation 410, the process includes determining a set of potential vulnerability checks for scanning a target asset using a scan engine. For example, referring to FIG. 1, the scan engine 112 may determine the one or more vulnerability checks 180 that represent a set of potential vulnerability checks for scanning a particular asset of the one or more assets 130 at the customer location 122. In various examples, the process may include loading vulnerability content associated with a scan of the target asset. The process may determine, based at least in part on the vulnerability check content, the set of potential vulnerability checks.

At operation 420, the process includes collecting, from the target asset, fingerprint data indicating which versions of software are installed on the target asset. For example, referring to FIG. 1, the scan engine 112 may communicate with the individual target assets 132, 134, and 136 at the customer location 122 to collect fingerprint data indicating which versions of software are installed on the individual target assets 132, 134, and 136, respectively.

At operation 430, the process includes determining, based at least in part on the fingerprint data, that a particular version of a local scan agent is installed on the target asset. For example, referring to FIG. 1, the scan engine 112 may determine that the first local scan agent 142 corresponds to a particular version of a local scan agent installed on the first asset 132. As another example, referring to FIG. 1, the scan engine 112 may determine that the Nth local scan agent 146 corresponds to a particular version of a local scan agent installed on the Nth asset 136.

At operation 440, the process includes determining whether the local scan agent is functioning. Responsive to a determination that the local scan agent is functioning, the process may proceed to operation 450. Responsive to a determination that the local scan agent is not functioning, the process may proceed to operation 460.

According to some examples, determining whether the local scan agent is functioning occurs at least partly responsive to determining that a complementary scan scheme option is enabled. Furthermore, responsive to determining that the complementary scan scheme is not enabled, the process may not determine whether the local scan agent is functioning, and the scan engine 112 may be used to perform all vulnerability checks in the set of potential vulnerability checks.

In some examples, to determine whether the local scan engine is functioning, the process may include collecting data indicative of a health status of the local scan agent. For example, as discussed herein with reference to FIGS. 1-2C, function checks may be used to obtain such data indicative of the health status of the local scan agent.

At operation 450, the process may include performing, using the scan engine, any vulnerability check, in the set of potential vulnerability checks, that is not covered by the local scan agent. For example, referring to FIG. 2C, performing the hybrid external/local scan 250 may include performing, using the scan engine 112, any vulnerability check, in the set of potential vulnerability checks, that is not covered by the Nth local scan agent 146 associated with the Nth asset 136.

In some examples, the process may include determining vulnerability check data collection attributable to the local scan agent. For example, the vulnerability check data collection attributable to the local scan agent may include: (i) a first set of vulnerability check data to be collected using the local scan agent, wherein the first set of vulnerability check data is sufficient for performing a first subset of the set of potential vulnerability checks; and/or (ii) a second set of vulnerability check data that has been collected using the local scan agent, wherein the second set of vulnerability check data is sufficient for performing a second subset of the set of potential vulnerability checks. Furthermore, the process may include determining a remainder subset, of the set of potential vulnerability checks, comprising one or more vulnerability checks that are not covered by the vulnerability check data collection attributable to the local scan agent. To perform, using the scan engine, any vulnerability check that is not covered by the local scan agent, the scan engine may be used to perform the remainder subset comprising the vulnerability check(s) that are not covered by the vulnerability check data collection attributable to the local scan agent.

In some examples, the vulnerability check data attributable to the local scan agent may be defined in vulnerability content as a meta property. For example, the vulnerability content may be loaded at least once per instance of the scan engine starting, and once per version of content per instance of the scan engine starting. When the vulnerability content is loaded, whether or not a particular vulnerability check is covered by a local scan agent would be known. According to some examples, upon initiating a scan, rules derived from the loaded vulnerability content may be processed/populated for the rules engine, and, if the complementary scan scheme option is enabled, the rules may be adjusted to allow for the functionality described herein related to skipping vulnerability checks that are covered by a local scan agent.

At operation 460, the process may include performing, using the scan engine, all vulnerability checks in the set of potential vulnerability checks. For example, referring to FIG. 2A, performing the external scan 210 may include performing, using the scan engine 112, all vulnerability checks, in the set of potential vulnerability checks, on the first asset 132.

Thus, FIG. 4 illustrates an example of a process of implementing a complementary scan engine scheme for avoiding redundant vulnerability check data collection when using a scan engine to scan a target asset.

FIG. 5 is a block diagram illustrating an example computer system 500 that is used to implement one or more portions of a system that implements a complementary scan engine scheme for avoiding redundant vulnerability checks when using a scan engine to scan a target asset, according to some embodiments. For example, the computer system 500 may be a server that implements one or more components of the computing resource(s) 110 of FIG. 1.

Computer system 500 may be implemented using a variety of computing devices, such as a personal computer system, desktop computer, laptop or notebook computer, mainframe computer system, handheld computer, workstation, network computer, a consumer device, application server, mobile telephone, or some other type of computing device.

As shown, computer system 500 includes one or more processors 510, which may include multiple cores coupled to a system memory 520 via an input/output (I/O) interface 530. Computer system 500 further includes a network interface 540 coupled to I/O interface 530. In some embodiments, computer system 500 may be a uniprocessor system including one processor 510, or a multiprocessor system including several processors 510a-n, as shown. The processors 510 may be any suitable processors capable of executing instructions. For example, in various embodiments, processors 510 may implement one of a number of instruction set architectures (ISAs), such as the x86, PowerPC, SPARC, or MIPS ISA.

As shown, the computer system 500 may also include one or more network communication devices (e.g., network interface 540) for communicating with other systems and/or components over a communications network. For example, an instance of an application executing on computer system 500 may use network interface 540 to communicate with another server application executing on another computer system, as described herein.

As shown, computer system 500 may use its network interface 540 to communicate with one or more other devices 560, such as persistent storage devices and/or one or more I/O devices. In some embodiments, some of these other devices may be implemented locally on the computer system 500, accessible via the I/O interface 530. In various embodiments, persistent storage devices may include disk drives, tape drives, solid state memory, other mass storage devices, or any other persistent storage device. The computer system 500 may store instructions and/or data in persistent storage devices, and retrieve the stored instruction and/or data as needed.

As shown, the computer system 500 may include one or more system memories 520 that store instructions and data accessible by processor(s) 510. In various embodiments, system memories 520 may be implemented using any suitable memory technology, (e.g., one or more of cache, static random-access memory (SRAM), DRAM, RDRAM, EDO RAM, DDR 10 RAM, synchronous dynamic RAM (SDRAM), EEPROM, non-volatile/Flash-type memory, etc.). The system memory 520 may be used to store code 525 or executable instructions to implement the methods and techniques described herein. For example, the executable instructions may include instructions to implement the scan engine 112, including the vulnerability check component(s) 114 and the metrics evaluation component(s) 118, as discussed. The system memory 520 may also be used to store data 526 needed or produced by the executable instructions. For example, the in-memory data 526 may include portions of the vulnerability data store 116, as discussed.

In some embodiments, some of the code 525 or executable instructions may be persistently stored on the computer system 500 and may have been loaded from external storage media. The persistent storage of the computer system 500 and the external media are examples of non-transitory computer-readable storage media, which may be used to store program instructions to be executed by the computer system 500. A non-transitory computer-readable storage medium may provide the capability to store information in a form readable by a machine (e.g., computer system 500). Non-transitory computer-readable media may include storage media such as magnetic or optical media, disk or DVD/CD-ROM devices, archival tapes, network-attached storage systems, or other computer systems.

In some embodiments, the I/O interface 530 may be configured to coordinate I/O traffic between processor 510, system memory 520 and any peripheral devices in the system, including through network interface 540 or other peripheral interfaces. In some embodiments, I/O interface 530 may perform any necessary protocol, timing, or other data transformations to convert data signals from one component (e.g., system memory 520) into a format suitable for use by another component (e.g., processor 510). In some embodiments, I/O interface 530 may include support for devices attached through various types of peripheral buses, such as a variant of the Peripheral Component Interconnect (PCI) bus standard or the Universal Serial Bus (USB) standard, for example. In some embodiments, the function of I/O interface 530 may be split into two or more separate components, such as a north bridge and a south bridge, for example. Also, in some embodiments, some or all of the functionality of I/O interface 530, such as an interface to system memory 520, may be incorporated directly into processor 510.

In some embodiments, the network interface 540 may allow data to be exchanged between computer system 500 and other devices attached to a network. The network interface 540 may also allow communication between computer system 500 and various I/O devices and/or remote storage systems. Input/output devices may, in some embodiments, include one or more display terminals, keyboards, keypads, touchpads, scanning devices, voice or optical recognition devices, or any other devices suitable for entering or retrieving data by one or more computer systems. Multiple input/output devices may be present in computer system 500 or may be distributed on various nodes of a distributed system that includes computer system 500. In some embodiments, similar input/output devices may be separate from computer system 500 and may interact with one or more nodes of a distributed system that includes computer system 500 through a wired or wireless connection, such as over network interface 540. Network interface 540 may commonly support one or more wireless networking protocols (e.g., Wi-Fi/IEEE 802.11, or another wireless networking standard). In some embodiments, the network interface 540 may support communication via telecommunications/telephony networks such as analog voice networks or digital fiber communications networks, via storage area networks such as Fibre Channel SANs, or via any other suitable type of network and/or protocol.

Various modifications and changes may be made as would be obvious to a person skilled in the art having the benefit of this disclosure. The various embodiments described herein are meant to be illustrative and not limiting. Many variations, modifications, additions, and improvements are possible. These and other variations, modifications, additions, and improvements may fall within the scope of embodiments as defined in the claims that follow.

What is claimed is:

1. A system, comprising:
one or more hardware processors with associated memory that implement a complementary scan engine that avoids redundant vulnerability check data collection during a scan of a target asset, wherein the one or more hardware processors are configured to:
load vulnerability check content associated with the scan of the target asset, wherein the vulnerability check content is stored in one or more vulnerability check content files and specifies a set of potential vulnerability checks to be performed during the scan of the target asset;
collect, from the target asset, fingerprint data indicating versions of software that are installed on the target asset;
determine, based at least in part on the fingerprint data, that a particular version of a local scan agent is installed on the target asset, wherein the local scan agent is configured to collect and report data about the target asset according to an agent schedule;
collect health status data of the local scan agent from the local scan agent, based at least in part on the particular version of the local scan agent;
determine, based at least in part on the health status data, whether the local scan agent is functioning;
responsive to a determination that the local scan agent is functioning:
interrogate the local scan agent to obtain a scan history of the local scan agent;
determine, prior to the scan of the target asset and based on the scan history of the local scan agent and the one or more vulnerability check content files, a data collection overlap between the data collected by the local scan agent and scan data to be collected by the scan engine; and
execute the scan to perform a subset of the set of potential vulnerability checks specified in one or more vulnerability check content files, so that the scan avoids collecting redundant data in the data collection overlap with the local scan agent; and
responsive to a determination that the local scan agent is not functioning:
execute the scan to perform all vulnerability checks in the set of potential vulnerability checks specified in one or more vulnerability check content files.

2. The system of claim 1, wherein the vulnerability check content is loaded when the scan engine is started.

3. The system of claim 1, wherein the one or more hardware processors are configured to:
determine whether a complementary scan option is enabled; and
responsive to a determination that the complementary scan option is not enabled:

perform, using the scan engine, all vulnerability checks in the set of potential vulnerability checks.

4. The system of claim 1, wherein the health status data of the local scan agent includes one or more scan performance metrics of the local scan agent.

5. The system of claim 1, wherein the one or more hardware processors are further configured to:
determine vulnerability check data collection attributable to the local scan agent, wherein the vulnerability check data collection attributable to the local scan agent comprise at least one of:
a first set of vulnerability check data to be collected using the local scan agent, wherein the first set of vulnerability check data is sufficient for performing a first subset of the set of potential vulnerability checks; or
a second set of vulnerability check data that has been collected using the local scan agent, wherein the second set of vulnerability check data is sufficient for performing a second subset of the set of potential vulnerability checks; and
determine a remainder subset, of the set of potential vulnerability checks, comprising one or more vulnerability checks that uses data that is not part of the vulnerability check data collection attributable to the local scan agent;
wherein the scan engine is used to perform the remainder subset comprising the one or more vulnerability checks.

6. The system of claim 1, wherein the one or more hardware processors are further configured to:
perform, using the scan engine, all vulnerability checks in the set of potential vulnerability checks for a second target asset based on a determination that there are no vulnerability checks that use data in a second vulnerability check data collection attributable to a second local scan agent installed on the second target asset.

7. The system of claim 1, wherein:
the target asset is a first target asset;
the set of potential vulnerability checks is a first set of potential vulnerability checks;
the fingerprint data is a first set of fingerprint data; and
the one or more hardware processors are further configured to:
determine a second set of potential vulnerability checks for scanning a second target asset using the scan engine;
collect, from the second target asset, a second set of fingerprint data indicating which versions of software are installed on the second target asset;
determine, based at least in part on the second set of fingerprint data, that no local scan agent is installed on the second target asset; and
responsive to a determination that no local scan agent is installed on the second target asset:
perform, using the scan engine, all vulnerability checks in the second set of potential vulnerability checks.

8. The system of claim 1, wherein:
the target asset is a first target asset;
the set of potential vulnerability checks is a first set of potential vulnerability checks;
the fingerprint data is a first set of fingerprint data; and
the one or more hardware processors are further configured to:

determine a second set of potential vulnerability checks for scanning a second target asset using the scan engine;
determine that a local scan agent installed on the second target asset is not functioning; and
responsive to a determination that the local scan agent installed on the second target asset is not functioning:
perform, using the scan engine, all vulnerability checks in the second set of potential vulnerability checks.

9. A method comprising:
executing, on one or more hardware processors, a complementary scan engine that avoids redundant vulnerability check data collection during a scan of a target asset, wherein the execution comprises:
loading vulnerability check content associated with the scan of the target asset, wherein the vulnerability check content is stored in one or more vulnerability check content files and specifies a set of potential vulnerability checks to be performed during the scan of the target asset;
collecting, from the target asset, fingerprint data indicating versions of software are that installed on the target asset;
determining, based at least in part on the fingerprint data, that a particular version of a local scan agent is installed on the target asset, wherein the local scan agent is configured to collect and report data about the target asset according to an agent schedule;
collecting health status data of the local scan agent from the local scan agent, based at least in part on the particular version of the local scan agent;
determining, based at least in part on the health status data, whether the local scan agent is functioning;
responsive to a determination that the local scan agent is functioning:
interrogating the local scan agent to obtain a scan history of the local scan agent;
determining, prior to the scan of the target asset and based on the scan history of the local scan agent and the one or more vulnerability check content files, a data collection overlap between the data collected by the local scan agent and scan data to be collected by the scan engine; and
executing the scan to perform a subset of the set of potential vulnerability checks specified in one or more vulnerability check content files, so that the scan avoids collecting redundant data in the data collection overlap with the local scan agent; and
responsive to a determination that the local scan agent is not functioning:
executing the scan to perform all vulnerability checks in the set of potential vulnerability checks specified in one or more vulnerability check content files.

10. The method of claim 9, wherein the execution of the scan engine further comprises:
determining whether a complementary scan option is enabled; and
responsive to determining that the complementary scan option is not enabled:
performing, using the scan engine, all vulnerability checks in the set of potential vulnerability checks.

11. The method of claim 9, wherein the health status data of the local scan agent includes one or more scan performance metrics of the local scan agent.

12. The method of claim 9, wherein the execution of the scan engine further comprises:
- determining vulnerability check data collection attributable to the local scan agent, wherein the vulnerability check data collection attributable to the local scan agent comprise at least one of:
  - a first set of vulnerability check data to be collected using the local scan agent, wherein the first set of vulnerability check data is sufficient for performing a first subset of the set of potential vulnerability checks; or
  - a second set of vulnerability check data that has been collected using the local scan agent, wherein the second set of vulnerability check data is sufficient for performing a second subset of the set of potential vulnerability checks; and
- determining a remainder subset, of the set of potential vulnerability checks, comprising one or more vulnerability checks that uses data that is not part of the vulnerability check data collection attributable to the local scan agent;
- wherein the scan engine is used to perform the remainder subset comprising the one or more vulnerability checks.

13. The method of claim 9, wherein the execution of the scan engine further comprises:
- performing, using the scan engine, all vulnerability checks in the set of potential vulnerability checks for a second target asset based on a determination that there are no vulnerability checks that use data in a second vulnerability check data collection attributable to a second local scan agent installed on the second target asset.

14. The method of claim 9, wherein:
- the target asset is a first target asset;
- the set of potential vulnerability checks is a first set of potential vulnerability checks;
- the fingerprint data is a first set of fingerprint data; and
- the execution of the scan engine further comprises:
  - determining a second set of potential vulnerability checks for scanning a second target asset using the scan engine;
  - collecting, from the second target asset, a second set of fingerprint data indicating which versions of software are installed on the second target asset;
  - determining, based at least in part on the second set of fingerprint data, that no local scan agent is installed on the second target asset; and
  - responsive to determining that no local scan agent is installed on the second target asset:
    - performing, using the scan engine, all vulnerability checks in the second set of potential vulnerability checks.

15. One or more non-transitory computer-accessible storage media storing program instructions that, when executed on or across one or more hardware processors, implement a complementary scan engine that avoids redundant vulnerability check data collection during a scan of a target asset and cause the system to:
- load vulnerability check content associated with the scan of the target asset, wherein the vulnerability check content is stored in one or more vulnerability check content files and specifies a set of potential vulnerability checks to be performed during the scan of the target asset;
- collect, from the target asset, fingerprint data indicating versions of software that are installed on the target asset;
- determine, based at least in part on the fingerprint data, that a particular version of a local scan agent is installed on the target asset, wherein the local scan agent is configured to collect and report data about the target asset according to an agent schedule;
- collect health status data of the local scan agent from the local scan agent, based at least in part on the particular version of the local scan agent;
- determine, based at least in part on the health status data, whether the local scan agent is functioning;
- responsive to a determination that the local scan agent is functioning:
  - interrogate the local scan agent to obtain a scan history of the local scan agent;
  - determine, prior to the scan of the target asset and based on the scan history of the local scan agent and the one or more vulnerability check content files, a data collection overlap between the data collected by the local scan agent and scan data to be collected by the scan engine; and
  - execute the scan to perform a subset of the set of potential vulnerability checks specified in one or more vulnerability check content files, so that the scan avoids collecting redundant data in the data collection overlap with the local scan agent; and
- responsive to a determination that the local scan agent is not functioning:
  - execute the scan to perform all vulnerability checks in the set of potential vulnerability checks specified in one or more vulnerability check content files.

16. The one or more non-transitory computer-accessible storage media of claim 15, wherein the program instructions further cause the system to:
- determine whether a complementary scan option is enabled; and
- responsive to a determination that the complementary scan option is not enabled:
  - perform, using the scan engine, all vulnerability checks in the set of potential vulnerability checks.

17. The one or more non-transitory computer-accessible storage media of claim 15, wherein the health status data of the local scan agent includes one or more scan performance metrics of the local scan agent.

18. The one or more non-transitory computer-accessible storage media of claim 15, wherein the program instructions further cause the system to:
- determine vulnerability check data collection attributable to the local scan agent, wherein the vulnerability check data collection attributable to the local scan agent comprise at least one of:
  - a first set of vulnerability check data to be collected using the local scan agent, wherein the first set of vulnerability check data is sufficient for performing a first subset of the set of potential vulnerability checks; or
  - a second set of vulnerability check data that has been collected using the local scan agent, wherein the second set of vulnerability check data is sufficient for performing a second subset of the set of potential vulnerability checks; and
- determine a remainder subset, of the set of potential vulnerability checks, comprising one or more vulnerability checks that uses data that is not part of the vulnerability check collection data attributable to the local scan agent;

wherein, the scan engine is used to perform the remainder subset comprising the one or more vulnerability checks.

19. The one or more non-transitory computer-accessible storage media of claim 15, wherein the program instructions further cause the system to:

perform, using the scan engine, all vulnerability checks in the set of potential vulnerability checks for a second target asset based on a determination that there are no vulnerability checks that use data in a second vulnerability check data collection attributable to a second local scan agent installed on the second target asset.

20. The one or more non-transitory computer-accessible storage media of claim 15, wherein:

the target asset is a first target asset;

the set of potential vulnerability checks is a first set of potential vulnerability checks;

the fingerprint data is a first set of fingerprint data; and the one or more hardware processors are further configured to:

determine a second set of potential vulnerability checks for scanning a second target asset using the scan engine;

collect, from the second target asset, a second set of fingerprint data indicating which versions of software are installed on the second target asset;

determine, based at least in part on the second set of fingerprint data, that no local scan agent is installed on the second target asset; and responsive to a determination that no local scan agent is installed on the second target asset:

perform, using the scan engine, all vulnerability checks in the second set of potential vulnerability checks.

\* \* \* \* \*